Oct. 28, 1941.  J. J. MACKOVICH  2,261,068
FISH LURE
Filed Dec. 26, 1940  2 Sheets—Sheet 1
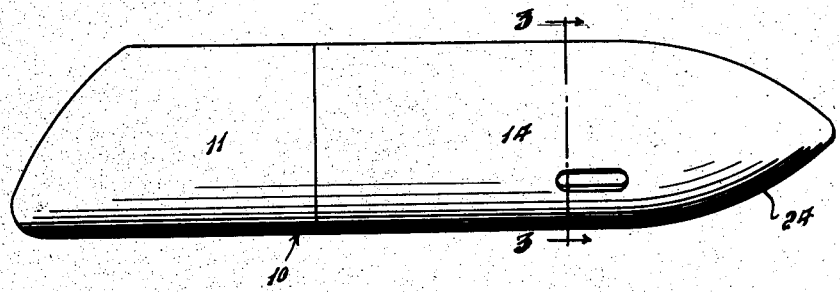
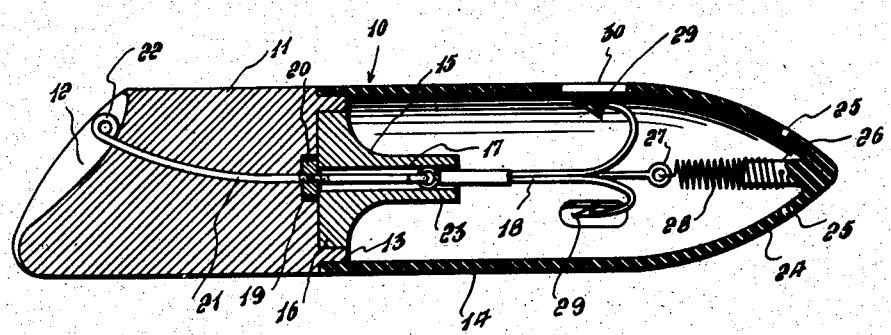
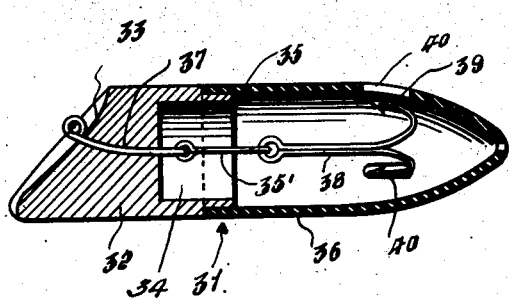
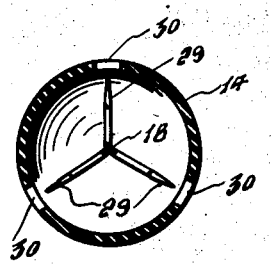
Inventor
John J. Mackovich
By L. F. Randolph
Attorney Oct. 28, 1941.  J. J. MACKOVICH  2,261,068
FISH LURE
Filed Dec. 26, 1940   2 Sheets-Sheet 2

Inventor
John J. Mackovich
By L. F. Randolph
Attorney

Patented Oct. 28, 1941

2,261,068

UNITED STATES PATENT OFFICE 2,261,068

FISH LURE

John J. Mackovich, Norwalk, Conn.

Application December 26, 1940, Serial No. 371,757

8 Claims. (Cl. 43—46)

This invention relates to an improved artificial lure for use in trolling and casting and having compressible means for normally covering the hooks to prevent the barbed ends of the hooks from snagging on logs, vegetation and other matter beneath or on the surface of the water.

More particularly, it is an aim of the invention to provide a plug or lure which cannot only be used in open waters, for which conventional plugs and lures are adapted, but which may also be used safely in shallow water and close to the shore in and around lily pads, weed beds, and stumps without danger of the loss of a strike or of the lure due to it being fouled on such obstructions.

Still a further aim of the invention is to provide a lure in which the fishhook or hooks will be normally disposed within the body of the lure and to be projected therefrom only when a fish strikes the lure.

Still another aim of the invention is to provide a lure having a hollow compressible body portion in which the fishhook or hooks are disposed and which is provided with slotted openings through which the barbed ends of the hook or hooks will be projected when the body portion is compressed by a fish striking the same.

Other objects and advantages of the invention will hereinafter become more fully apparent from the following description of the drawings, which illustrate preferred embodiments thereof, and wherein—

Figure 5:
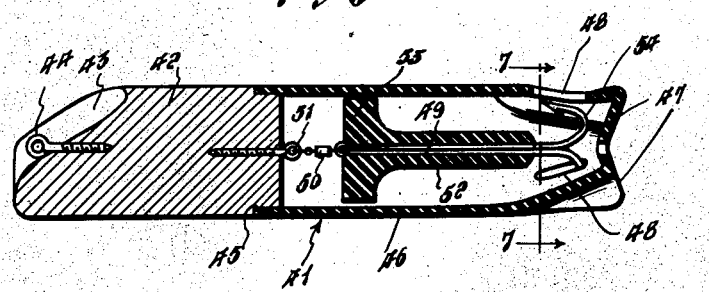
Figure 6:
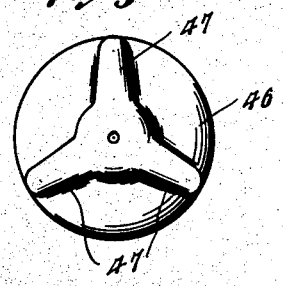
Figure 7:
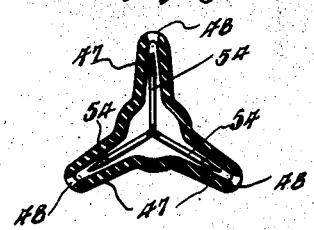
Figure 8:
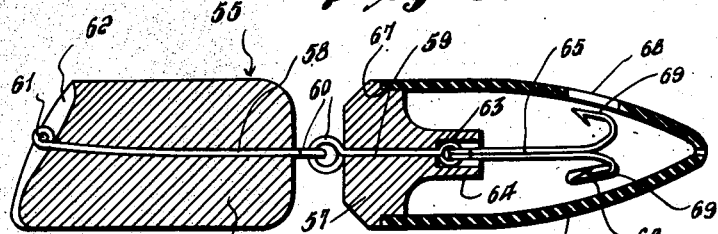
Figure 9:
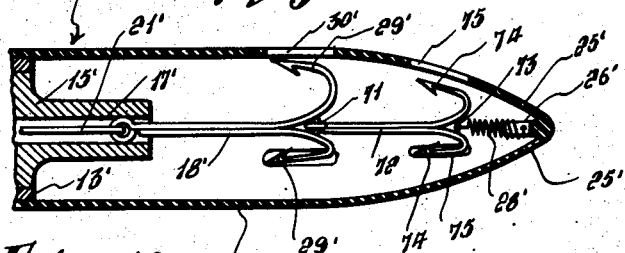
Figure 10:
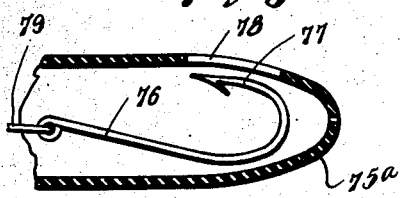

Figure 1 is a side elevational view of a lure body constructed in accordance with the invention, Figure 2 is a longitudinal substantially central vertical sectional view, partly in elevation, of the same, Figure 3 is a transverse sectional view taken substantially along the plane of the line 3—3 of Figure 1, Figure 4 is a view similar to Figure 2 of another embodiment of the invention, Figure 5 is a side elevational view partly in vertical section of another form of the invention, Figure 6 is an end view in elevation looking toward the tail end of the lure shown in Figure 5, Figure 7 is a transverse sectional view taken substantially along the plane of the line 7—7 of Figure 5, Figure 8 is a view similar to Figure 2 of another embodiment of the invention, Figure 9 is a fragmentary longitudinal vertical sectional view of still another modified form of the invention, and Figure 10 is a view similar to Figure 9 of still a further embodiment of the invention.

Referring more particularly to the drawings, wherein like reference characters designate like or corresponding parts throughout the different views, and referring particularly to Figures 1 to 3, 10 designates generally one form of the lure or plug including a solid head portion 11 having an upwardly and rearwardly inclined concave forward face 12 and a restricted annular flange 13 which projects from its opposite, rear end. The lure 10 also includes a rear or tail portion 14 which is hollow and formed of a resilient compressible material such as rubber. The tail portion 14 is provided with an open forward end which is disposed around the annular flange 13 and suitably secured thereto for connecting it to the head portion 11. A stem 15 is provided with an enlarged end 16 which is disposed within and secured to the flange 13. The stem 15 is provided with a longitudinal bore 17 for receiving the shank end of a fishhook 18 which is disposed within the restricted portion of the stem 15, which extends into the hollow tail portion 14. The head 11 is provided with a recess 19 which opens into the recess formed by the flange 13 and in which is disposed a nut 20 which is attached to the threaded intermediate portion of a rod 21. One end of the rod 21 extends forwardly through the head portion 11 and is provided with a looped end 22 disposed in the concave face 12 and by means of which a fish line, not shown, may be attached to the lure 10. The opposite end of the rod 21 extends into the bore 17 and is connected to an eyelet 23 on the shank end of the hook 18.

The tail portion 14 is provided with a tapered free end 24 having a plurality of apertures 25 and an integral stem portion 26 which extends inwardly of the tail portion 14. The hook 18 is provided at the opposite end of its shank portion with an eyelet 27 to which is connected one end of a contractile coil spring 28, the opposite end of which is attached to the stem 26. The fishhook 18 is provided with three barbed ends 29 and the tail portion 14 is provided with three elongated openings 30 which are arranged to receive the barbed ends 29 when the tail portion 14 is compressed.

From the foregoing it will be obvious that the tail portion 14 will normally maintain an expanded position, as illustrated in Figures 1 to 3, so that the barbed ends 29 will be disposed within the body of the lure so that they cannot snag on obstructions. When a fish strikes the lure 10 the tail portion 14 will be compressed causing the barbed ends 29 or at least one of them to be projected through the openings or an opening 30 for hooking the fish. The spring 28 will hold the hook 18 in an extended position and the rod 21 will prevent the hook from turning and thereby combine with the spring 28 to hold the barbs 29 in proper positions to pass through the openings 30 when the tail portion 14 is compressed. The rod 21 may be adjusted relatively to the stem 15 by turning it in the nut 20 for extending or retracting the fishhook 18 for correctly positioning its barbed ends 29 relatively to the openings 30. The apertures 25 are provided to permit the water to be drained from the hollow tail portion 14.

In Figure 4, in which another embodiment of the invention is shown, the lure or plug, designated generally 31 is provided with a head portion 32 having a concave forward face 33 corresponding to the concave face 12 and a recessed opposite trailing end 34 provided with a restricted annular flange 35 to which is connected the open forward end of a hollow compressible tail portion 36 which is formed of a resilient material such as rubber. A bar or rod 37 is provided with a looped end disposed within the concave face 33 for engaging a fishing line, not shown, similarly to the looped end 22 and an opposite looped end which is disposed within the recess of portion 34 for engaging an eyelet on one end of a link 35', the opposite end of which is provided with an eyelet for engaging the eyelet of the shank end of a fishhook 38 which is provided with three barbed ends 39 disposed within the hollow tail member 36 and adjacent to openings 40 thereof which are provided for the same purpose as the openings 30 of the lure 10. It will thus be seen that the fishhook 38 is pivotally mounted within the tail portion 36 and is adapted to be disposed so that its barbed ends 39 will be projected through the openings 40 when a fish strikes the lure 31 and compresses its tail portion 36.

In Figures 5, 6 and 7 another embodiment of the invention is shown wherein a lure or plug designated generally 41 is provided with a head portion 42 in the concave forward face 43 of which is provided an eyelet 44 for the same purpose as the eyelet 22. The opposite trailing end of the head portion 42 is reduced at 45 to receive the open end of a resilient, hollow compressible tail portion 46 which, like the tail portions 14 and 36 is preferably formed of rubber. The trailing or rear end of the tail portion 46 is restricted to form three radially projecting substantially equally spaced fins 47 which are hollow and which are provided with elongated slot like openings 48 in their outer edges. A fishhook 49 is provided with an eyelet in its shank end which is connected to one end of the chain of links 50 and the opposite end of chain 50 is connected to an eyelet 51 which is secured in the rear end of the head portion 42. A spacing member 52 is mounted on the shank of the hook 49 and is provided with an enlarged end 53 of a diameter slightly less than the inner diameter of the tail portion 46 and which is adapted to hold the hook 49 in an extended position in the tail portion 46. The hook 49 is provided with three equally spaced barbed ends 54 each of which is disposed in a recess formed by a fin 47, as best seen in Figure 7.

The fins 47 are adapted to flap when the lure 41 is drawn through the water to simulate the action of a fish and the spacing member 52 combines with the fins 47 to hold the barbed ends 54 in positions adjacent the openings 48 so that when a fish strikes the lure 41 and the tail portion 46 thereof is compressed one or more of the barbs 54 will be projected through openings 48 for hooking the fish.

In the embodiment of the invention as disclosed in Figure 8, the lure or plug designated generally 55 is provided with a head portion formed of the sections 56 and 57 each of which is provided with a rod. The rod 58 of the head portion 56 and the rod 59 of the head portion 57 are provided with eyelets 60 at their adjacent ends which are disposed between said head portions and which are connected for pivotally connecting the head portions. The opposite end of the rod 58 is provided with an eyelet 61 disposed in the concave forward face 62 of the head portion 56 and the opposite end of the rod 59 is provided with an eyelet 63 disposed in a restricted stem portion 64 of the head portion 57 and to which is connected the shank end of a fishhook 65 which projects from the stem 64 and which is supported substantially rigid thereby. A hollow, compressible and resilient tail portion 66 has its open end attached to a restricted portion 67 of head portion 57 and projects therefrom and tapers towards its opposite, trailing end. The tail portion 66 is provided with three equally spaced elongated openings 68, each of which is disposed to receive a barbed end 69 of the hook 65 when the tail portion 66 is compressed. The barbed ends 69 are projected through the openings 68 by the tail portion 66 being compressed by a fish striking the lure 55. The pivot connection 60 will permit the portion 57 and the tail 66 to flap relatively to the head portion 56 to simulate the action of a swimming fish.

In the embodiment of the invention as shown in Figure 9, the lure or plug, designated generally 70 is similar to the lure or plug 10 and includes a head portion, not shown, corresponding to the head portion 11 and a tail portion 14' which is elongated and which is attached to the outer side of the annular flange 13', a portion of which is shown. A fishhook 18' has its shank end mounted in the bore 17' of the stem 15' and attached to one end of the rod 21'. The opposite end of the shank of the fishhook 18' is provided with an eyelet 71 to which is connected an eyelet in the shank end of a hook 72 which is likewise provided with an eyelet 73, corresponding to the eyelet 71 and to which is connected one end of a contractile coil spring 28', the opposite end of which is connected to a stem portion 26' which is formed integral with the trailing end of the tail portion 14'. The spring 28' yieldably holds the fishhooks 18' and 72 in extended, tandem relationship relatively to one another and in extended positions relatively to the body portion 14'. Each of the fishhooks 18' and 72 is provided with three barbed ends 29' and 74, respectively, and the tail portion 14' has three elongated openings 30' for receiving the barbed ends 29' and three openings 75 for receiving the barbed ends 74 when the tail portion 14' is compressed by a fish striking the same. As illustrated, the fishhook 72 and the barbs 74 are smaller than the fishhook 18' and its barbs 29' and is disposed in the restricted, trailing end of the tail portion 14', which tail portion is likewise provided with drainage openings 25'.

In the embodiment of the invention as shown in Figure 10, a tail portion 75a is disclosed which is smaller than the tail portions of the other lures or plugs and adapted to contain a fishhook 76 having a single barbed end 77. The tail portion 75a is adapted to be connected to a suitable head portion such as those shown in the other embodiments of the invention and like the other tail portions is formed of a material such as rubber which is resilient and compressible. The tail portion 75a is provided with an elongated slot like opening 78 through which the barbed end 77 will be projected when the tail portion 75a is compressed. The hook 76 is preferably pivotally attached to a rod or link 79 which may be suitably attached to a head portion not shown, to which the tail portion 75a is connected in the same manner, for example, as disclosed in Figure 4.

Various other modifications and changes are contemplated and may obviously be resorted to as only preferred embodiments of the invention are disclosed.

I claim as my invention:

1. An artificial lure comprising a head portion, a hollow compressible body member attached at one end to an end of the head portion and projecting therefrom, a hook disposed within the cavity of said hollow compressible member and having its shank end pivotally connected to the head portion, said hollow compressible member being provided with an elongated opening arranged to permit passage of the barbed end of the hook therethrough when said body member is compressed, and a spacing member mounted on the shank of said hook for maintaining the hook in an extended position.

2. An artificial lure comprising a head portion, a hollow compressible body member attached at one end to an end of the head portion and projecting therefrom, a hook disposed within the cavity of said hollow compressible member and having its shank end pivotally connected to the head portion, said hollow compressible member being provided with an elongated opening arranged to permit passage of the barbed end of the hook therethrough when said body member is compressed, and means for retaining the hook in an extended position with its barbed end adjacent to said opening.

3. An artificial lure comprising a head portion, a hollow compressible body member attached at one end to an end of the head portion and projecting therefrom, a hook disposed within the cavity of said hollow compressible member and having its shank end pivotally connected to the head portion, said hollow compressible member being provided with an elongated opening arranged to permit passage of the barbed end of the hook therethrough when said body member is compressed, and a contractile spring connected at one end to the free end of said compressible member and extending inwardly thereof and connected at its opposite end to the hook for yieldably holding the hook in an extended position.

4. An artificial lure comprising a head portion, a hollow compressible body member attached at one end to an end of the head portion and projecting therefrom, a hook disposed within the cavity of said hollow compressible member and having its shank end pivotally connected to the head portion, said hollow compressible member being provided with an elongated opening arranged to permit passage of the barbed end of the hook therethrough when said body member is compressed, the free end or tail portion of said hollow compressible member being restricted to form a hollow fin, and the barbed end of said hook being disposed in the hollow of said fin and being held thereby in a position to be directed through said opening when said member is compressed.

5. An artificial lure comprising a head portion, a hollow compressible tail portion connected at one end to said head portion and extending therefrom, said head portion having a hollow stem projecting into the tail portion, a hook disposed in the tail portion and having its shank end mounted in the hollow stem portion for supporting the hook in a fixed position within the tail portion, said tail portion being provided with an elongated opening arranged to receive the barbed end of the hook when the tail portion is compressed.

6. An artificial lure including a hollow compressible body portion, one end of said body portion being restricted to form a plurality of hollow fin like projections, said fin like projections each being provided with an elongated opening in the outer edge thereof, a fish hook disposed in said hollow portion and having a plurality of barbed ends, and each of said barbed ends being disposed in the hollow of one of said fin portions and held thereby in a position to be projected through said opening when said portion is compressed.

7. An artificial lure comprising a lure body formed of a head portion and a tail portion, said tail portion being formed of a compressible material and being hollow, said tail portion having an open end attached to the head portion, a plurality of hooks pivotally connected in tandem relationship and disposed in said hollow tail portion, the shank end of the forwardmost hook being connected to the head portion, each of said hooks being provided with a plurality of barbed ends, and said hollow tail portion having a plurality of elongated openings arranged to permit said hooks to be projected therethrough when said tail portion is compressed.

8. An artificial lure as in claim 7, comprising a contractile spring connected at one end to the free end of said tail portion and connected at its opposite end to the rearmost hook for holding said hooks in extended positions relatively to one another and to the tail portion.

JOHN J. MACKOVICH.